(12) United States Patent
Cheng

(10) Patent No.: US 10,556,608 B2
(45) Date of Patent: Feb. 11, 2020

(54) MOVING CARRIER

(71) Applicant: UNIQUE PRODUCT & DESIGN CO., LTD., Tainan (TW)

(72) Inventor: Chih-Ching Cheng, Tainan (TW)

(73) Assignee: UNIQUE PRODUCT & DESIGN CO., LTD., Tainan (TW)

(*) Notice: Subject to any disclaimer, the term of this patent is extended or adjusted under 35 U.S.C. 154(b) by 0 days.

(21) Appl. No.: 16/224,170

(22) Filed: Dec. 18, 2018

(65) Prior Publication Data

US 2019/0202487 A1 Jul. 4, 2019

Related U.S. Application Data

(60) Provisional application No. 62/612,156, filed on Dec. 29, 2017.

(51) Int. Cl.
| | |
|---|---|
| *B62B 3/02* | (2006.01) |
| *B62B 3/12* | (2006.01) |
| *B62B 3/04* | (2006.01) |
| *B62B 5/06* | (2006.01) |
| *A63B 55/60* | (2015.01) |

(Continued)

(52) U.S. Cl.
CPC .............. *B62B 3/022* (2013.01); *A63B 55/60* (2015.10); *B62B 3/04* (2013.01); *B62B 3/12* (2013.01); *B62B 5/06* (2013.01); *A63B 2102/32* (2015.10); *A63B 2210/50* (2013.01); *B62B 3/104* (2013.01); *B62B 3/106* (2013.01); *B62B 7/044* (2013.01); *B62B 7/086* (2013.01); *B62B 2202/404* (2013.01); *B62B 2202/42* (2013.01);

(Continued)

(58) Field of Classification Search
CPC .. B62B 3/022; B62B 3/04; B62B 3/12; B62B 3/106; B62B 3/104; B62B 5/06; B62B 2205/003; B62B 2203/44; B62B 2202/42; B62B 2202/404; B62B 7/044; B62B 7/086; B62B 2205/00; A63B 55/60; A63B 2210/50; A63B 2102/32
See application file for complete search history.

(56) References Cited

U.S. PATENT DOCUMENTS

| | | | |
|---|---|---|---|
| 6,698,789 B2* | 3/2004 | Reimers ................. | B62B 1/045 280/651 |
| 7,048,283 B2* | 5/2006 | Wu .......................... | B62B 3/12 280/38 |

(Continued)

*Primary Examiner* — Erez Gurari
(74) *Attorney, Agent, or Firm* — Muncy, Geissler, Olds & Lowe, P.C.

(57) ABSTRACT

A moving carrier is disclosed. A lower-frame assembly includes a first moving member disposed on the guiding member, a second moving member disposed on the guiding member, an elastic member disposed corresponding to the guiding member, and a third moving member disposed on the second moving member. A transmitting member of a front-wheel assembly has a guiding groove. One end of the third moving member is disposed in the guiding groove. When the first moving member moves along the guiding member, the first moving member enables the elastic member to store a first energy. When the elastic member releases the first energy, the second moving member drives the third moving member to move and the third moving member pushes the guiding groove to move, so that the transmitting member can drive the front-wheel frame to move toward the lower-frame assembly.

20 Claims, 11 Drawing Sheets

(51) Int. Cl.
  *A63B 102/32* (2015.01)
  *B62B 3/10* (2006.01)
  *B62B 7/08* (2006.01)
  *B62B 7/04* (2006.01)

(52) U.S. Cl.
  CPC ....... *B62B 2203/44* (2013.01); *B62B 2205/00* (2013.01); *B62B 2205/003* (2013.01)

(56) References Cited

U.S. PATENT DOCUMENTS

| | | | | |
|---|---|---|---|---|
| 8,191,920 | B2* | 6/2012 | Zhang | B62B 3/02 280/47.26 |
| 8,292,321 | B2* | 10/2012 | Liao | B62B 3/02 280/47.26 |
| 8,500,140 | B1* | 8/2013 | Liao | B62B 7/10 280/38 |
| 8,500,153 | B2* | 8/2013 | Liao | B62B 3/02 280/651 |
| 10,023,213 | B1* | 7/2018 | Corcoran | B62B 3/04 |
| 10,322,738 | B1* | 6/2019 | Wu | B62B 3/022 |
| 2004/0075247 | A1* | 4/2004 | Lin | B62B 7/08 280/642 |
| 2005/0046130 | A1* | 3/2005 | Cheng | B62B 1/045 280/47.26 |
| 2005/0121864 | A1* | 6/2005 | Liao | B62B 3/12 280/38 |
| 2006/0071434 | A1* | 4/2006 | Cheng | B62B 3/12 280/47.26 |
| 2009/0295130 | A1* | 12/2009 | Liao | B62B 3/12 280/651 |
| 2009/0295219 | A1* | 12/2009 | Wu | B60B 3/001 301/111.01 |
| 2010/0052275 | A1* | 3/2010 | Reimers | B62B 3/022 280/47.26 |
| 2011/0006495 | A1* | 1/2011 | Chaudeurge | B60B 33/0039 280/39 |
| 2013/0026739 | A1* | 1/2013 | Liao | B62B 3/02 280/651 |
| 2014/0232077 | A1* | 8/2014 | Zhang | B62B 3/12 280/47.34 |
| 2016/0185374 | A1* | 6/2016 | Zhang | B62B 3/02 280/651 |
| 2017/0183024 | A1* | 6/2017 | Liao | B62B 7/086 |
| 2019/0009810 | A1* | 1/2019 | Gorza | B62B 7/062 |
| 2019/0315383 | A1* | 10/2019 | Wang | B62B 3/12 |

* cited by examiner

MOVING CARRIER

CROSS REFERENCE TO RELATED APPLICATIONS

The non-provisional patent application claims priority to U.S. provisional patent application with Ser. No. 62/612,156 filed on Dec. 29, 2017. This and all other extrinsic materials discussed herein are incorporated by reference in their entirety.

BACKGROUND

Technology Field

The present disclosure relates to a moving carrier and, in particular, to a foldable moving carrier having wheels.

Description of Related Art

Small moving carriers with wheels, such as golf carts, strollers, shopping carts, or other types of carts, can provide a considerable convenience for people during traveling, daily leisure events, shopping, or entertainment events. If the moving carriers have a foldable function, it is possible to fold the moving carriers to make the carriage, transportation, or storage thereof more convenient.

However, although the conventional carts can provide some conveniences for users, the folding procedure thereof is usually complicated and needs time and skill to fold the cart for the storage purpose. Besides, the folded carts still occupy a large space, which is not benefit to the carriage, transportation or storage.

SUMMARY

An objective of the present disclosure is to provide a foldable moving carrier with wheels, which can be easily folded and has a small folded size, so that the user can easily carry, transport or store it.

The present disclosure provides a moving carrier, which comprises an upper-frame assembly, a lower-frame assembly and a front-wheel assembly. The lower-frame assembly has a first end and a second end. The upper-frame assembly is connected to the first end of the lower-frame assembly. The lower-frame assembly comprises a first moving member, a second moving member, an elastic member, a guiding member and a third moving member. The first moving member is disposed on the guiding member, the second moving member is disposed at one end of the guiding member away from the first moving member, the elastic member is disposed corresponding to the guiding member, and the third moving member is disposed on the second moving member. The front-wheel assembly is connected to the second end of the lower-frame assembly. The front-wheel assembly comprises a transmitting member and a front-wheel frame. The transmitting member is connected to the front-wheel frame and has a guiding groove, and one end of the third moving member is disposed in the guiding groove. When the first moving member moves along the guiding member, the first moving member enables the elastic member to store a first energy. When the elastic member releases the first energy, the second moving member drives the third moving member to move and the third moving member pushes the guiding groove to move, so that the transmitting member drives the front-wheel frame to move toward the lower-frame assembly.

As mentioned above, in the moving carrier of this disclosure, the lower-frame assembly comprises a first moving member disposed on the guiding member, a second moving member disposed at one end of the guiding member away from the first moving member, an elastic member disposed corresponding to the guiding member, and a third moving member disposed on the second moving member. The transmitting member of the front-wheel assembly has a guiding groove, and one end of the third moving member is disposed in the guiding groove. Based on the above-mentioned structure and design, when the first moving member moves along the guiding member, the first moving member enables the elastic member to store a first energy. When the elastic member releases the first energy, the second moving member drives the third moving member to move and the third moving member pushes the guiding groove to move, so that the transmitting member drives the front-wheel frame to move toward the lower-frame assembly, thereby folding the moving carrier. Accordingly, it is time and effort saving in the procedures of folding and unfolding the moving carrier of this disclosure. As a result, the moving carrier of this disclosure can be easily folded and has a small folded size, so that the user can easily carry, transport or store it.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

To be noted, in order to illustrate the detailed structure inside the moving carrier 1 of this disclosure, some assemblies or elements of the moving carrier 1 are not shown in FIGS. 3 to 6B, FIG. 9 and FIG. 10.

Figure 1:
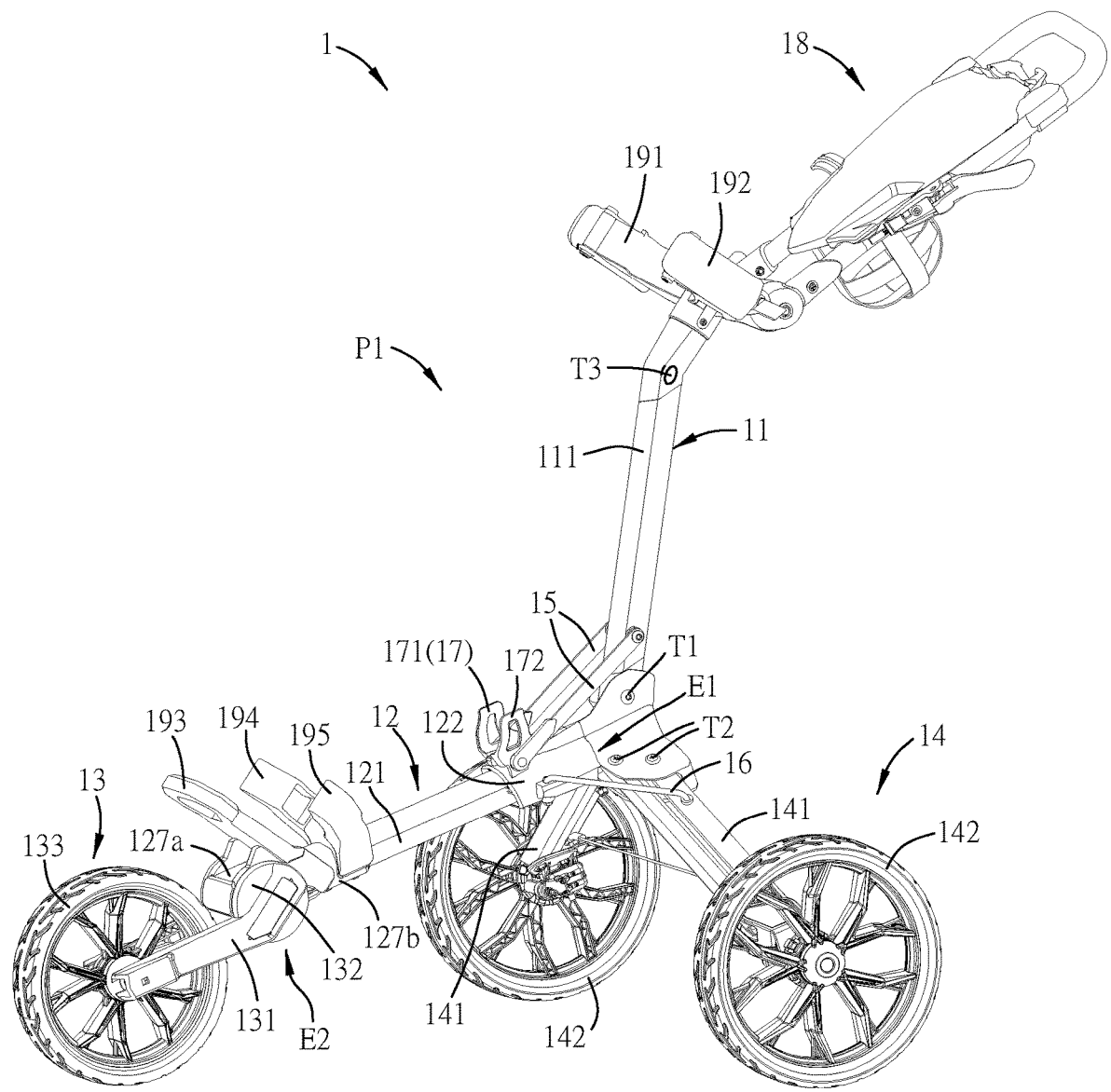
FIG. 1 is a schematic diagram showing a moving carrier according to an embodiment of this disclosure.
Figure 2:
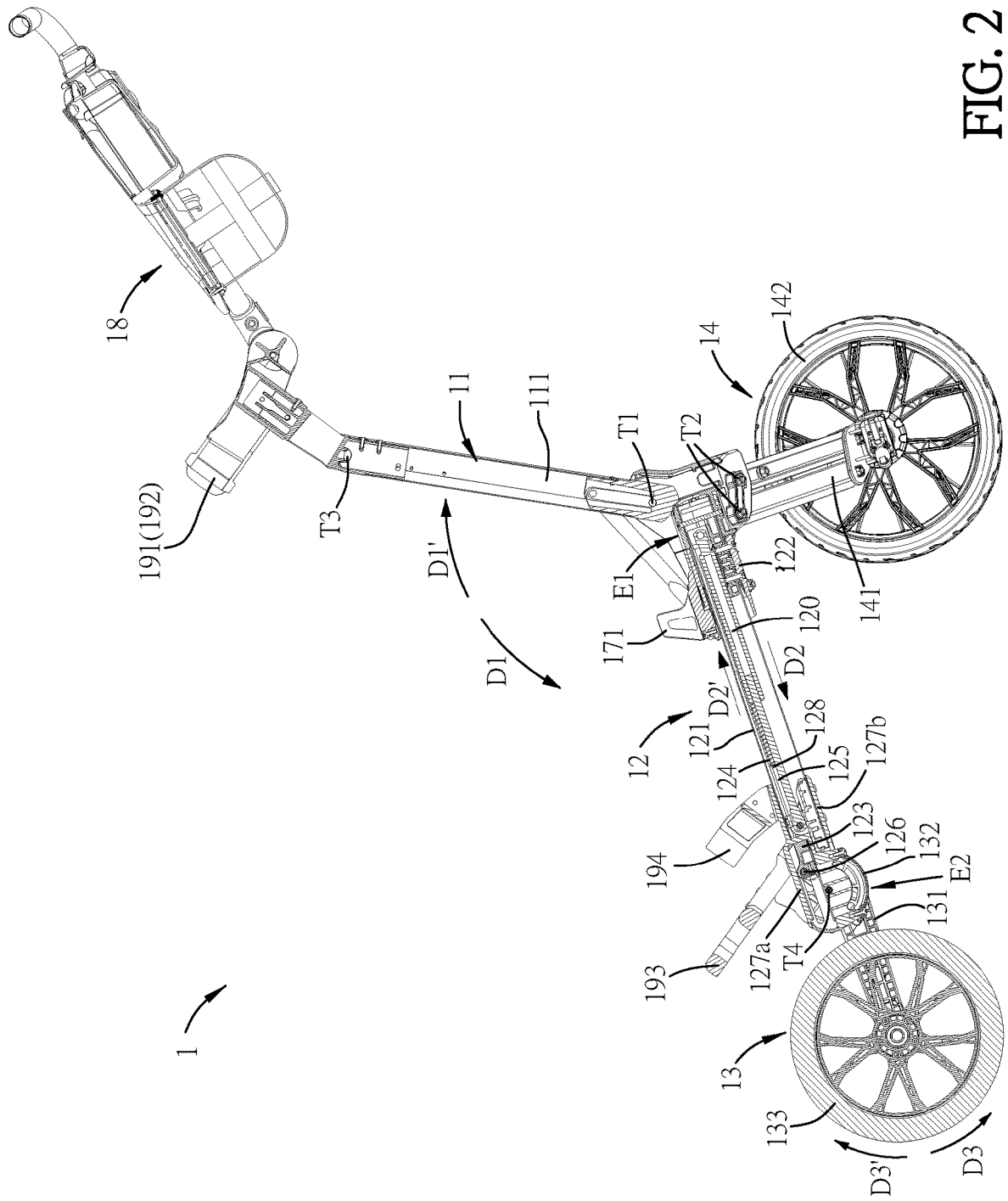
FIG. 2 is a sectional view of the moving carrier of FIG. 1.
Figure 3:
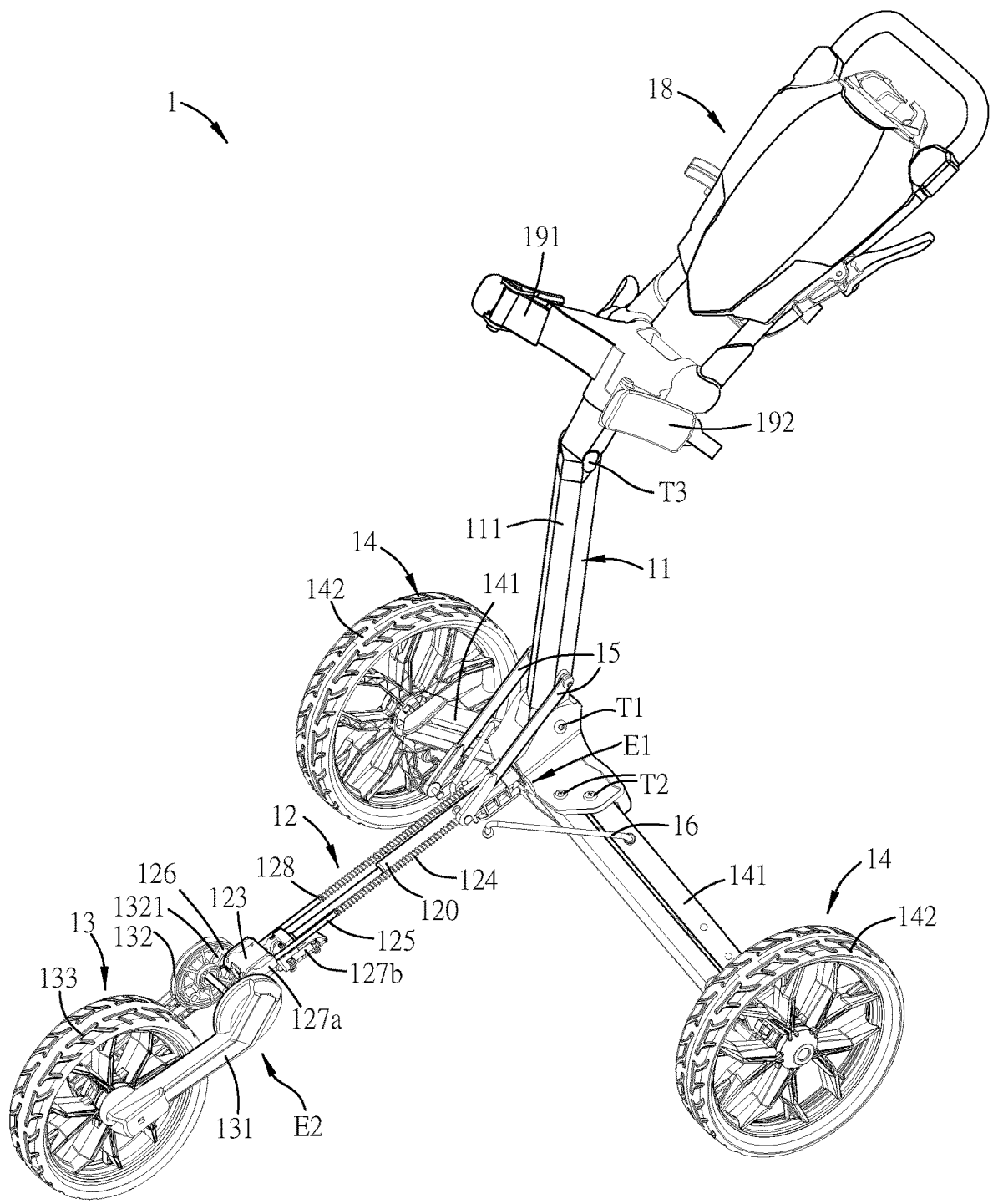
FIG. 3 is a schematic diagram showing a part of the moving carrier of FIG. 1.

FIG. 1 is a schematic diagram showing a moving carrier according to an embodiment of this disclosure, FIG. 2 is a sectional view of the moving carrier of FIG. 1, and FIG. 3 is a schematic diagram showing a part of the moving carrier of FIG. 1. To be noted, only a part of the lower-frame assembly 12 is shown in FIG. 3.

As shown in FIGS. 1 to 3, the moving carrier 1 of this disclosure is a foldable cart with wheels, which can be, for example but not limited to, a golf cart, a stroller, a shopping cart, or any of other types of carts. In this embodiment, the moving carrier 1 is a golf cart as an example. The detailed structure of the moving carrier 1 will be described hereinafter, and the folding and unfolding procedures thereof will be illustrated later.

The moving carrier 1 comprises an upper-frame assembly 11, a lower-frame assembly 12, and a front-wheel assembly 13. In addition, the moving carrier 1 further comprises a rear-wheel assembly 14, a first connecting member 15, and a second connecting member 16.

The lower-frame assembly 12 has a first end E1 and a second end E2. The upper-frame assembly 11 is connected to the first end E1 of the lower-frame assembly 12. In this embodiment, the upper-frame assembly 11 is pivotally connected to the first end E1 of the lower-frame assembly 12 through a pivot mechanism T1. Accordingly, the upper-frame assembly 11 can be pivotally rotated about the pivot mechanism T1, and be moved toward and close to the lower-frame assembly 12.

The lower-frame assembly 12 comprises a lower frame 121, a first moving member 122, a second moving member 123, an elastic member 124, a guiding member 125, and a third moving member 126. The first moving member 122, the second moving member 123, the elastic member 124 and the guiding member 125 are disposed on the lower frame 121. In this embodiment, as shown in FIG. 2, the elastic member 124, the guiding member 125 and the second moving member 123 are disposed inside the lower frame 121, and the first moving member 122 is partially inside the lower frame 121 and partially outside the lower frame 121.

As shown in FIGS. 2 and 3, the first moving member 122 is located adjacent to the first end E1 and disposed on the guiding member 125. In this embodiment, the first moving member 122 is a sliding block and is capable of sliding on the guiding member 125. The guiding member 125 is movably disposed on the lower frame 121. In addition, the second moving member 123 is located adjacent to the second end E2 and disposed at one end of the guiding member 125 away from the first moving member 122. The second moving member 123 is relatively movable with respect to the lower frame 121, but is relatively unmovable with respect to the guiding member 125 (the second moving member 123 is fixed on one end of the guiding member 125 away from the first moving member 122). The elastic member 124 is disposed corresponding to the guiding member 125. In this embodiment, as shown in FIG. 3, two elastic members 124 are springs, and two guiding members 125 are linking bars. The linking bar (guiding member 125) passes through the spring (elastic member 124), so that the trace of the elastic member 124 during the compressing procedure and energy-release procedure can be more stable, and the restoring of the elastic member 124 can also be more stable. In other embodiments, the amount of the elastic members 124 and guiding members 125 can be one, two or more, and they can be arranged in parallel to the lower frame 121 based on the design. Moreover, as shown in FIG. 2, the third moving member 126 is disposed on the second moving member 123. In this embodiment, the third moving member 126 passes through the second moving member 123, and the third moving member 126 protrudes beyond two sides of the second moving member 123.

The front-wheel assembly 13 is connected to the second end E2 of the lower-frame assembly 12. In this embodiment, the front-wheel assembly 13 is pivotally connected to the lower-frame assembly 12 through a pivot mechanism T4. Accordingly, the front-wheel assembly 13 can be pivotally rotated about the pivot mechanism T4, and be moved toward and close to the lower-frame assembly 12 (see FIG. 2). The front-wheel assembly 13 comprises a front-wheel frame 131 and a transmitting member 132. The transmitting member 132 is connected to the front-wheel frame 131 and has a guiding groove 1321 (FIG. 3). In addition, the front-wheel assembly 13 further comprises a front wheel 133 connected to the front-wheel frame 131. In this embodiment, the front-wheel assembly 13 comprises two front-wheel frames 131 and two transmitting members 132, the two front-wheel frames 131 and the two transmitting members 132 are disposed at two sides of the second end E2 of the lower-frame assembly 12, respectively. The two front-wheel frames 131 are connected to two sides of the front wheel 133, respectively. The transmitting member 132 is, for example, a rotation disk containing the guiding groove 1321. Herein, the shape of the guiding groove 1321 is, for example but not limited to, a straight line. In other embodiments, the shape of the guiding groove 1321 can be modified to an arc, other shapes, or their combinations based on the design requirement. Furthermore, the front-wheel frame 131 is fixed to the transmitting member 132, and one end of the third moving member 126 is disposed inside the guiding groove 1321. In this embodiment, the guiding groove 1321 is a straight slot in the transmitting member 132, and the third moving member 126 is a pin protruding beyond two sides of the second moving member 123, so that the third moving member 126 can be inserted into the corresponding straight slots (guiding grooves 1321) and move along the straight slots.

The rear-wheel assembly 14 is connected to the first end E1 of the lower-frame assembly 12. In this embodiment, the rear-wheel assembly 14 is pivotally connected to the lower-frame assembly 12 through a pivot mechanism T2. Accordingly, the rear-wheel assembly 14 can be pivotally rotated about the pivot mechanism T2, and be moved toward and close to the lower-frame assembly 12. In addition, two ends of the first connecting member 15 connect to the first moving member 122 and the upper-frame assembly 11, respectively, and two ends of the second connecting member 16 connect to the first moving member 122 and the rear-wheel assembly 14, respectively. The upper-frame assembly 11 comprises an upper frame 111, and the rear-wheel assembly 14 comprises a rear-wheel frame 141 and a rear wheel 142. In this embodiment, the moving carrier 1 comprises two rear-wheel frames 141, two rear wheels 142, two first connecting members 15, and two second connecting members 16. Two ends of at least one of the first connecting members 15 connect to the first moving member 122 and the upper frame 111, respectively, and two ends of at least one of the second connecting members 16 connect to the first moving member 122 and the rear-wheel frame 141, respectively.

As shown in FIGS. 1 and 2, the lower-frame assembly 12 further comprises a first fixing member 127a disposed at one side of the second end E2 of the lower-frame assembly 12, and the second moving member 123 is disposed on the first fixing member 127a. In this embodiment, the first fixing member 127a is fixed on the lower frame 121, so that the first fixing member 127a is fixed with respective to the lower frame 121. To be noted, the second moving member 123 is movably disposed on the first fixing member 127a, which means that the second moving member 123 is movable with respective to the lower frame 121. In this embodiment, a guiding groove is provided inside the first fixing member 127a corresponding to the second moving member 123, so that the guiding member 125 can push the second moving member 123 so as to move the second moving member 123 in the guiding groove of the first fixing member 127a. Thus, the second moving member 123 can be relatively moved with respective to the lower frame 121. When the upper-frame assembly 11 drives the first moving member 122 to move along the guiding member 125, the first moving member 122 enables the elastic member 124 to store a first energy. When the elastic member 124 releases the first energy, the second moving member 123 drives the third moving member 126 to move, and the third moving member 126 pushes the guiding groove 1321 to move, so that the transmitting member 132 can drive the front-wheel frame 131 to move toward the lower-frame assembly 12. The detailed operation thereof will be described hereinafter.

In this embodiment, the moving carrier 1 further comprises an engaging assembly 17 and a handlebar-frame assembly 18. The engaging assembly 17 is disposed on the lower-frame assembly 12. The engaging assembly 17 of this embodiment comprises two engaging members 171 and 172, which are fixed to the lower frame 121 for engaging with the upper-frame assembly 11 when the moving carrier 1 is in a folded position. In addition, the handlebar-frame assembly 18 is connected to the upper-frame assembly 11. In this embodiment, the handlebar-frame assembly 18 is pivotally connected to one end of the upper-frame assembly 11 away from the lower-frame assembly 12 through a pivot mechanism T3. Moreover, in order to fasten the object to be placed on the moving carrier 1 (e.g. a golf bag) and prevent the falling of the object, the moving carrier 1 further comprises two upper stopping members 191 and 192, one lower stopping member 193, and two side stopping members 194 and 195. The two upper stopping members 191 and 192 are disposed at two sides of the handlebar-frame assembly 18 close to the upper-frame assembly 11. The lower stopping member 193 is disposed at one side of the lower-frame assembly 12 close to the front-wheel assembly 13. The two side stopping members 194 and 195 are disposed at two sides of the lower-frame assembly 12 and located between the lower stopping member 193 and the engaging assembly 17. Accordingly, when the object is placed on the moving carrier 1, the upper and lower sides and the left and right sides (adjacent to the lower side) of the object can be stopped by the stopping members so as to prevent the falling of the object during moving. In some embodiments, the opening widths of the two upper stopping members 191 and 192 or the side stopping members 194 and 195 can be adjusted, and the opening widths thereof can be equal to or greater than 140 mm. This design can make the moving carrier 1 to fit and fix the object of different widths so as to prevent the falling of the object during operation.

Figure 4:
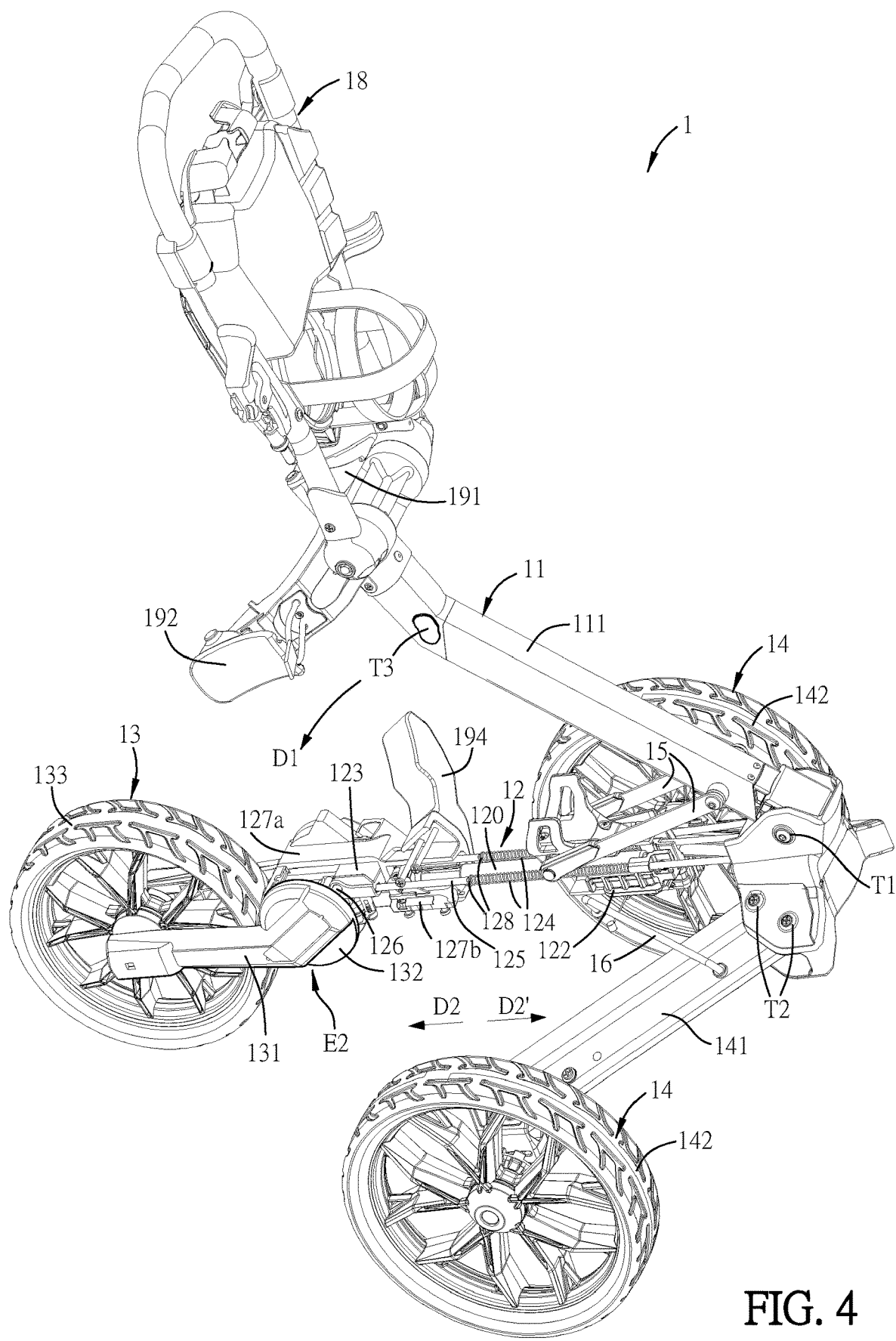
FIGS. 4, 5 and 6A are schematic diagrams showing the folding procedure of the moving carrier of FIG. 1.
Figure 5:
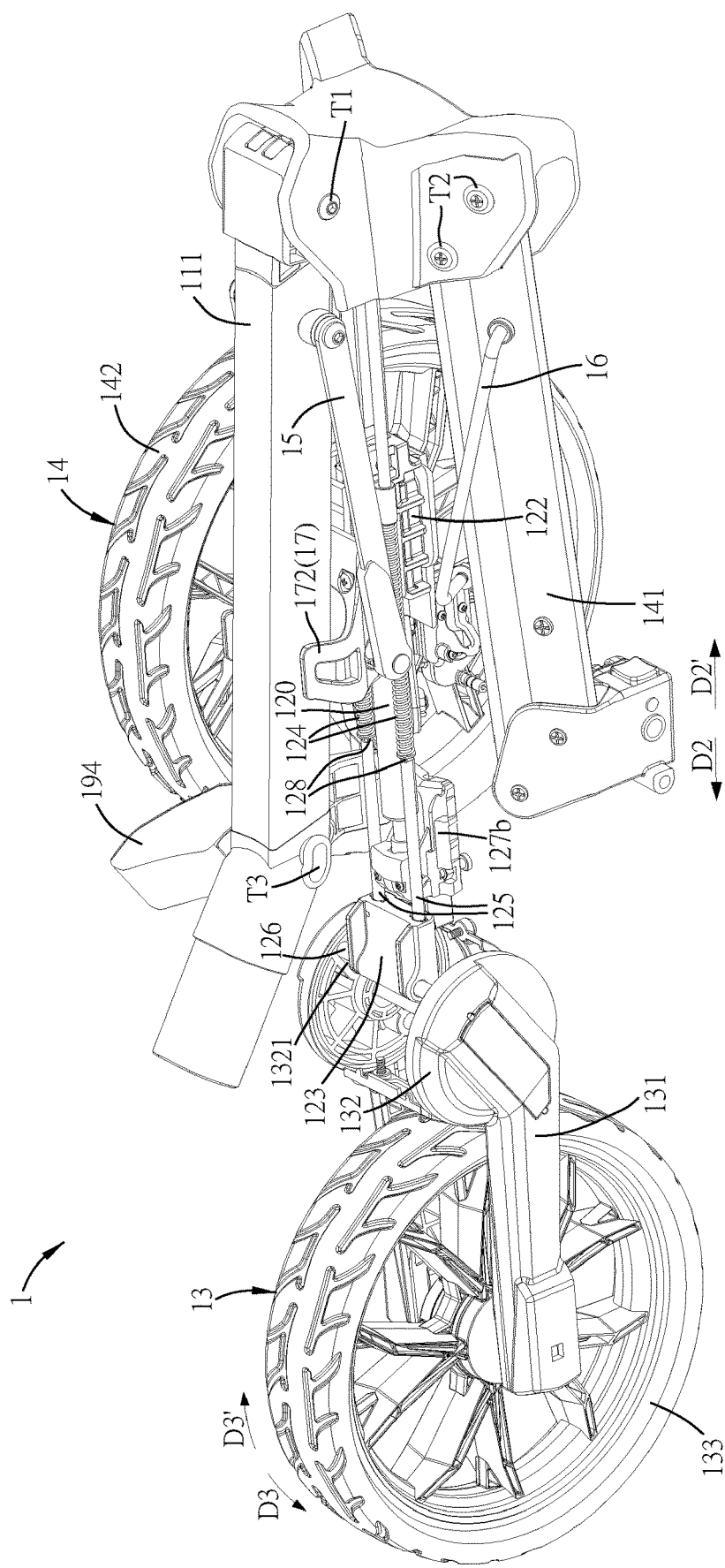
Figure 6A:
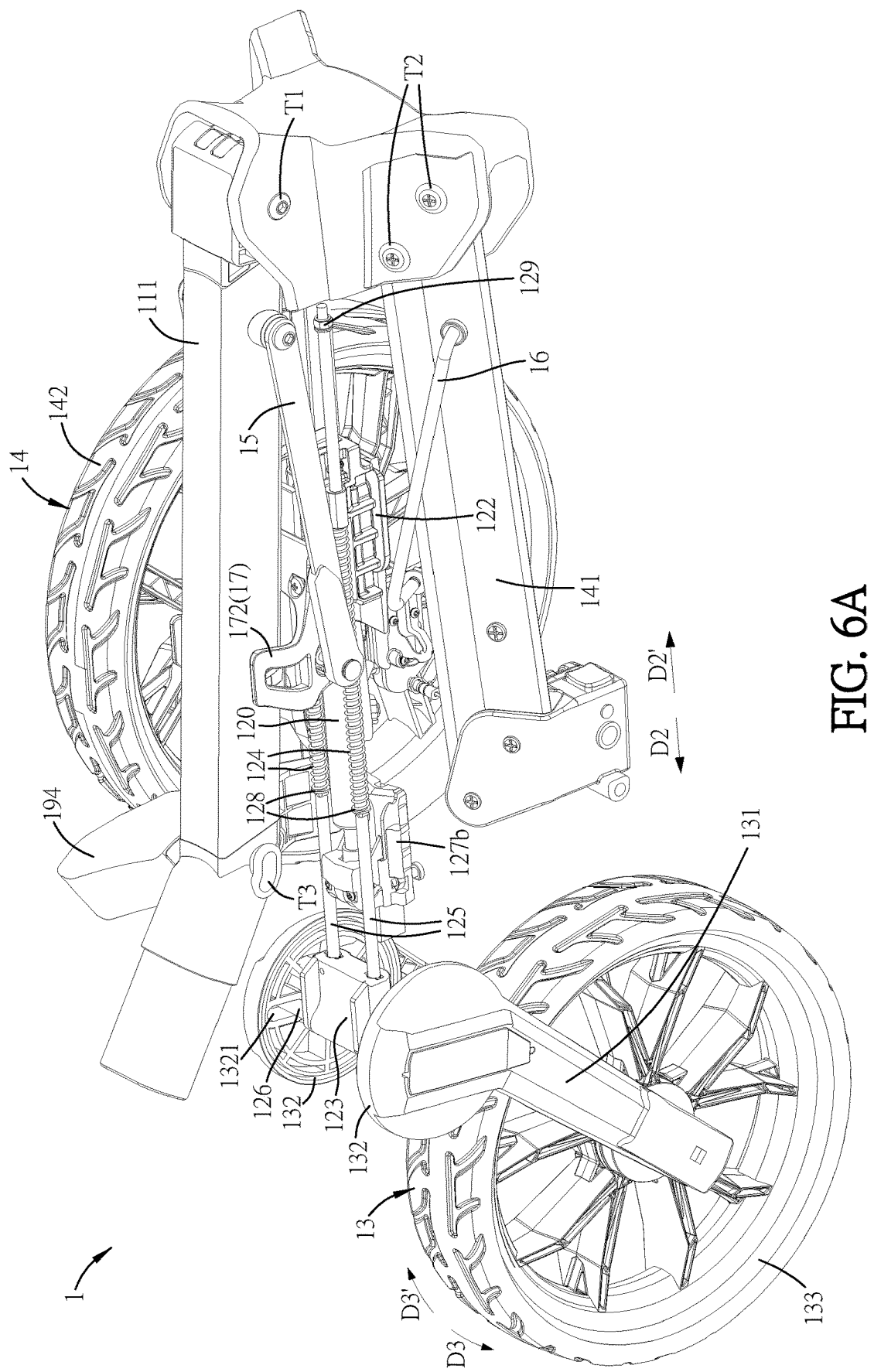
Figure 6B:
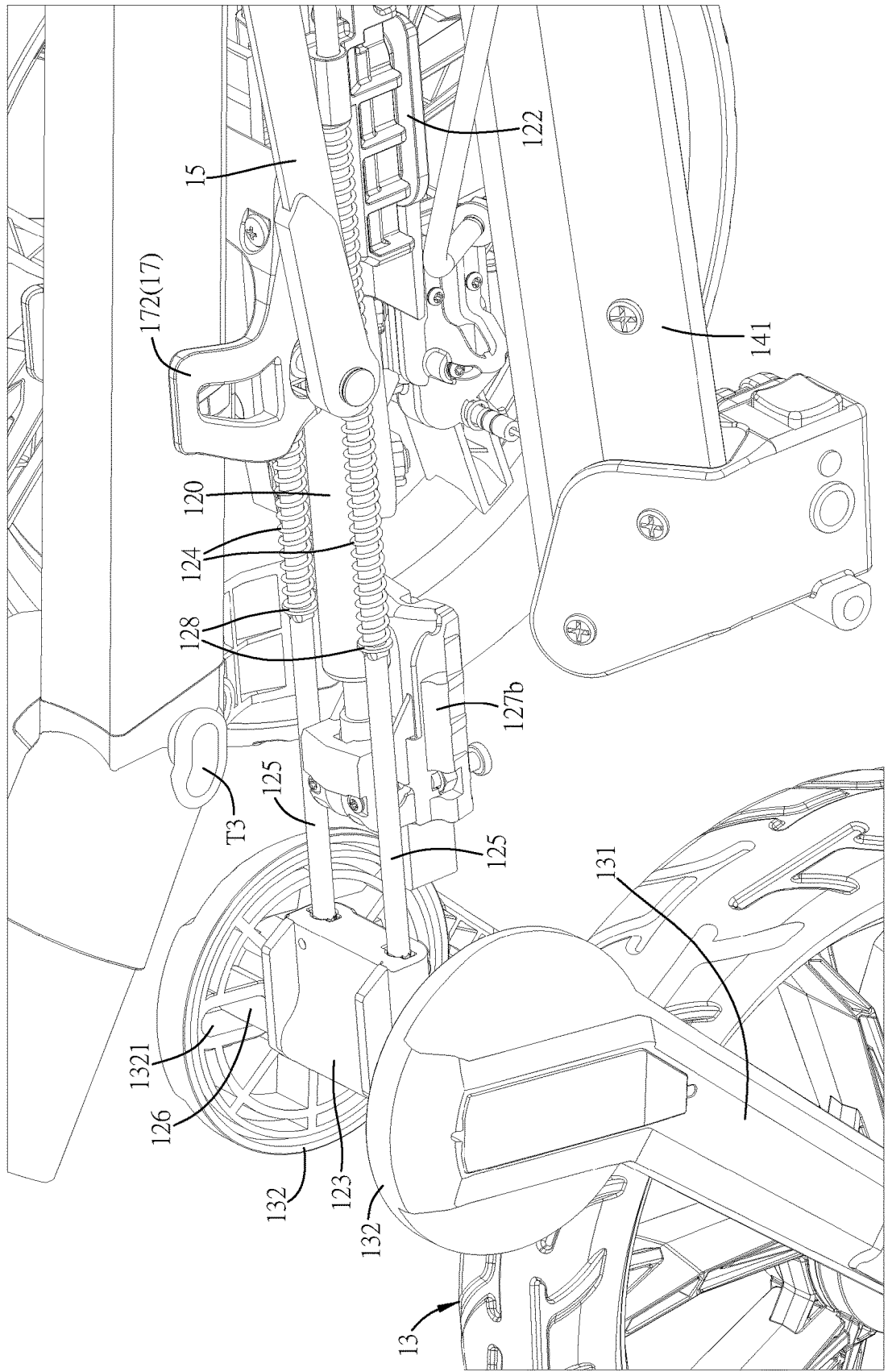
FIG. 6B is a partial enlarged view of FIG. 6A.
Figure 7:
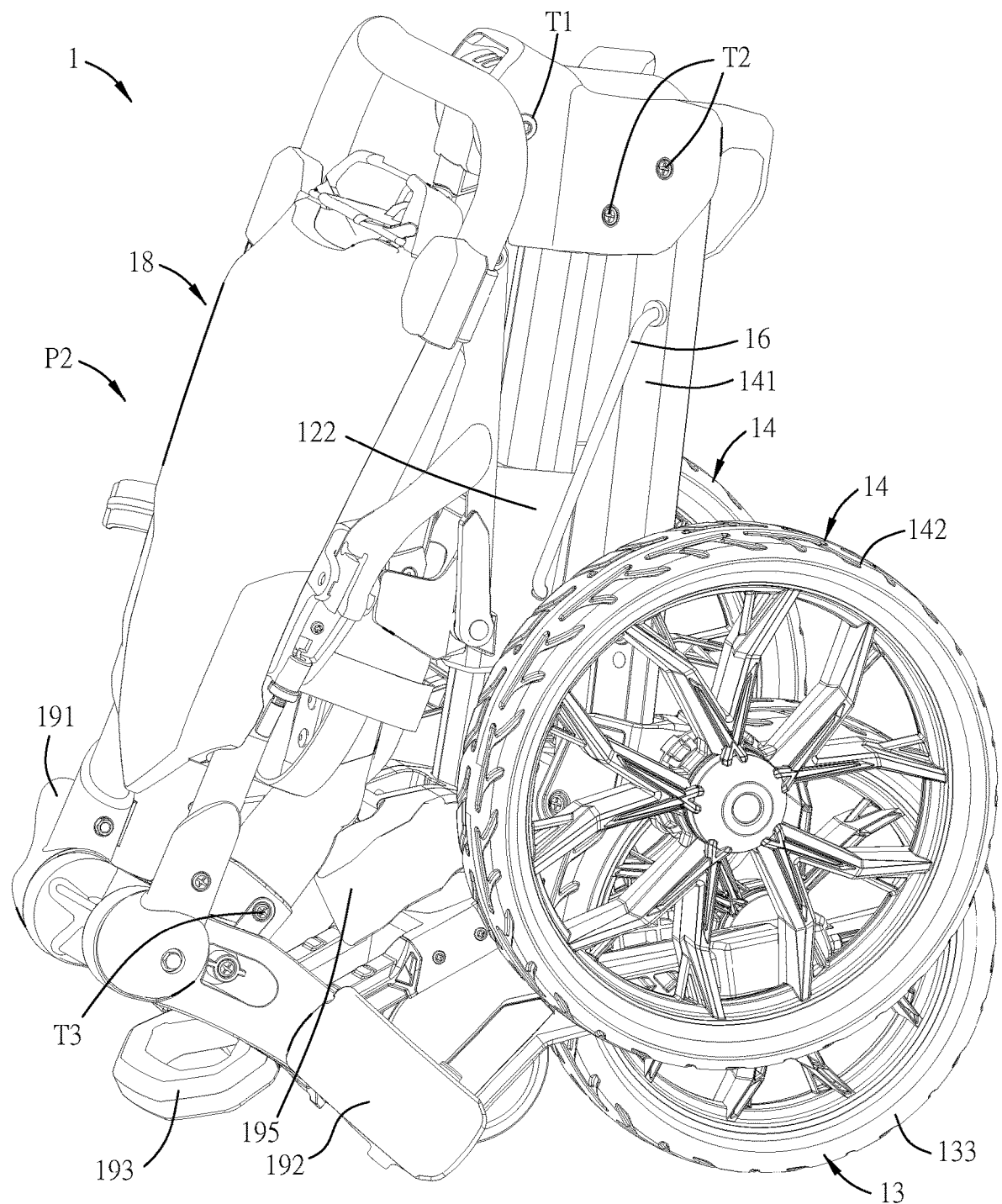
FIG. 7 is a schematic diagram showing the folded moving carrier (folded status) of FIG. 1.

The internal operation of the moving carrier 1 during the folding procedure will be described hereinafter with reference to FIGS. 1 to 3 in view of FIGS. 4 to 7. FIGS. 4, 5 and 6A are schematic diagrams showing the folding procedure of the moving carrier 1 of FIG. 1, FIG. 6B is a partial enlarged view of FIG. 6A, and FIG. 7 is a schematic diagram showing the folded moving carrier 1 (folded status) of FIG. 1. Herein, some components are not shown in FIGS. 4 to 6B.

As shown in FIGS. 3 to 6B, the lower-frame assembly 12 of this embodiment further comprises a linking member 120, a second fixing member 127b, a first stopping member 128, and a second stopping member 129 (see FIG. 6A). The first stopping member 128, the second stopping member 129, the second fixing member 127b and the linking member 120 are disposed on the lower frame 121, and the first stopping member 128 and the second stopping member 129 are disposed corresponding to the elastic member 124. Two ends of the linking member 120 connect to the first moving member 122 and the second fixing member 127b (see FIG. 4), respectively. In this embodiment, the linking member 120 can be an energy storage device such as, for example but not limited to, a pressure bar. The second fixing member 127b is fixed to one side of the lower frame 121 away from the upper-frame assembly 11 and connected to the first fixing member 127a. In addition, the first stopping member 128 can be, for example but not limited to, a stopping block, which is disposed on one side of the guiding member 125 away from the first moving member 122 and located between the first moving member 122 and the second moving member 123. The elastic member 124 is located between the first stopping member 128 and the first moving member 122. As shown in FIG. 6A, the second stopping member 129 can be, for example but not limited to, a screw nut, which is disposed on (screwed to) one end (tail) of the guiding member 125 away from the second moving member 123. To be noted, the first moving member 122, the second moving member 123, the first fixing member 127a and the second fixing member 127b mentioned above can be individually components with a single piece structure or be composed of multiple parts, and this disclosure is not limited.

Figure 8:
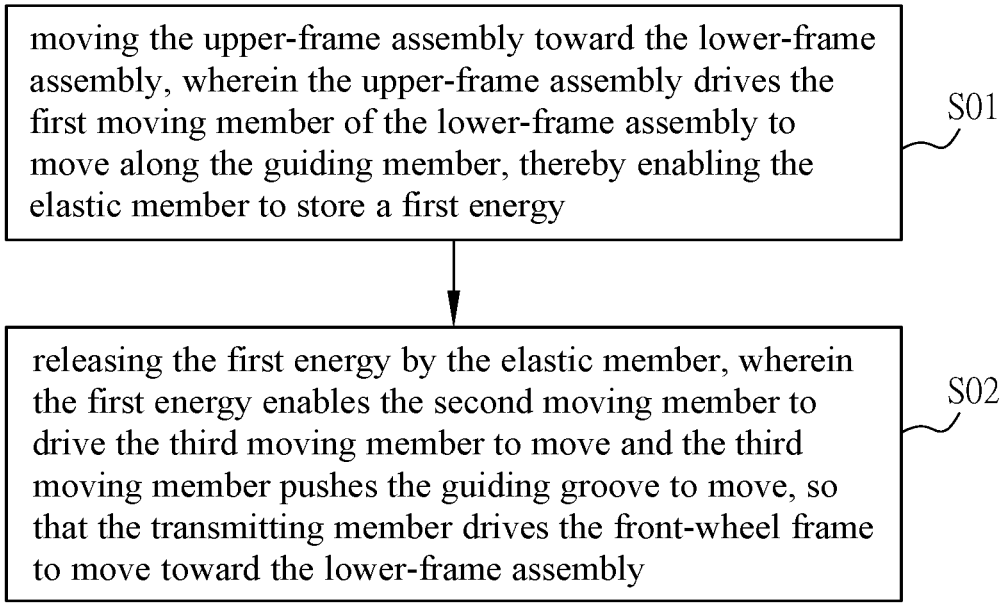
FIG. 8 is a flow chart of a folding method of the moving carrier of FIG. 1.

FIG. 8 is a flow chart of a folding method of the moving carrier 1 of FIG. 1. Normally, the moving carrier 1 has an operation status (or in-use status) and a folded status. Referring to FIG. 1, the operation status includes an operation position P1 (or opening position or in-use position). Referring to FIG. 7, the folded status includes a folded position P2. As shown in FIG. 8, the folding method of the moving carrier 1 comprises a step S01 for moving the upper-frame assembly toward the lower-frame assembly, wherein the upper-frame assembly drives the first moving member of the lower-frame assembly to move along the guiding member, thereby enabling the elastic member to store a first energy, and a step S02 for releasing the first energy by the elastic member, wherein the first energy enables the second moving member to drive the third moving member to move and the third moving member pushes the guiding groove to move, so that the transmitting member drives the front-wheel frame to move toward the lower-frame assembly.

In the moving carrier 1 of this embodiment, when the moving carrier 1 is in the operation status (operation position P1), the upper-frame assembly 11 is moved toward the lower-frame assembly 12. Meanwhile, the upper-frame assembly 11 can drive the first moving member 122 of the lower-frame assembly 12 to move along the guiding member 125, thereby enabling the elastic member 124 to store a first energy (step S01). In this case, when the moving carrier 1 is in the operation status (operation position P1) as shown in FIG. 1, the user can hold the upper-frame assembly 11 and push the upper-frame assembly 11 to move toward the lower-frame assembly 12 along a first direction D1. As shown in FIG. 4, the direction D1 is a rotation direction. Meanwhile, the upper-frame assembly 11 can drive the first moving member 122 through the first connecting member 15 to move along the guiding member 125 toward a second direction D2 (see FIG. 2). Herein, the second direction D2 is a direction parallel to the length of the lower frame 121, and is an extending direction of the lower-frame assembly 12. At the same time, when the upper-frame assembly 11 moves toward the lower-frame assembly 12 along the first direction D1, the first moving member can drive the rear-wheel assembly 14 through the second connecting member 16 to move toward the lower-frame assembly 12. When the upper-frame assembly 11 drives the first moving member 122 to move along the guiding member 125 toward the second direction D2, the first moving member 122 and the first stopping member 128 can compress the elastic member 124 so as to enable the elastic member 124 to store a first energy. In addition, the first moving member 122 and the second fixing member 127b can compress the linking member 120 so as to enable the linking member 120 to store a second energy. Herein, the first energy stored by the elastic member 124 can be used to automatically fold the front-wheel assembly 13, and the second energy stored by the linking member 120 can be used to assist to open the moving carrier 1. According to this design, the folding procedure and opening procedure (unfolding procedure) can be time and effort saving.

During the folding procedure of the moving carrier 1, the moving carrier 1 is usually placed on the ground, and the front wheel 133 contacts the ground. Accordingly, the first energy stored by the elastic member 124, which is large enough to automatically fold the front-wheel assembly 13, cannot be released due to the resistance caused by the weight of the moving carrier 1, so that the front-wheel assembly 13 is not automatically folded yet. Referring to FIGS. 5, 6A and 6B, the user may make the front wheel 133 leave the ground (e.g. lifting the front wheel assembly 13 including the front wheel 133), so that the elastic member 124 can release the first energy to enable the second moving member 123 through the guiding member 125 to drive the third moving member 126, and the third moving member 126 can push the guiding groove 1321 of the front-wheel assembly 13 (transmitting member 132) to move. Then, the transmitting member 132 can drive the front-wheel frame 131 to rotate and move toward the lower-frame assembly 12 (toward a third direction D3) (step S02). The first energy released by the elastic member 124 can push the second moving member 123 through the first stopping member 128 so as to drive the third moving member 126 to move toward the second direction D2. Meanwhile, the movement of the second moving member 123 toward the second direction D2 can be transmitted by the third moving member 126 and the transmitting member 132 so as to rotate the transmitting member 132 along the third direction D3. At the same time, the front-wheel frame 131 can drive the front wheel 133 to rotate along the third direction D3, so that the front wheel 133 can be automatically folded and placed under the lower-frame assembly 12 when the moving carrier 1 is in the folded position P2 as shown in FIG. 7. The two rear wheels 142 can also be driven by the first moving member 122 and the second connecting member 16 and be located at two sides of the lower-frame assembly 12, and the front wheel 133 is located between the two rear wheels 142. In other embodiments, if the front wheel 133 does not contact the ground, the elastic member 124 can also release the first energy after accumulating for a certain energy, and the stored first energy can be provided to push the second moving member 123 to drive the third moving member 126 toward the second direction D2, thereby moving the transmitting member 132 to rotate along the third direction D3. Accordingly, the front wheel 133 can be automatically folded and placed under the lower-frame assembly 12.

As shown in FIGS. 5 and 6A, the folding method of the moving carrier 1 further comprises a step of engaging the upper-frame assembly 11 to an engaging assembly 17 for fixing the upper-frame assembly 11. To be noted, this step of engaging the upper-frame assembly 11 to the engaging assembly 17 can be performed before or after the step S02, and this disclosure is not limited. In addition, as shown in FIG. 7, the folding method of the moving carrier 1 further comprises a step of folding the handlebar-frame assembly 18 with respective to the upper-frame assembly 11 through the pivot mechanism T3 to reach the upper side of the upper-frame assembly 11, thereby finishing the folding procedure of the moving carrier 1 (FIG. 7). The other technical features of the folding method of the moving carrier 1 can be referred to the above description, so the details thereof will be omitted.

Figure 9:
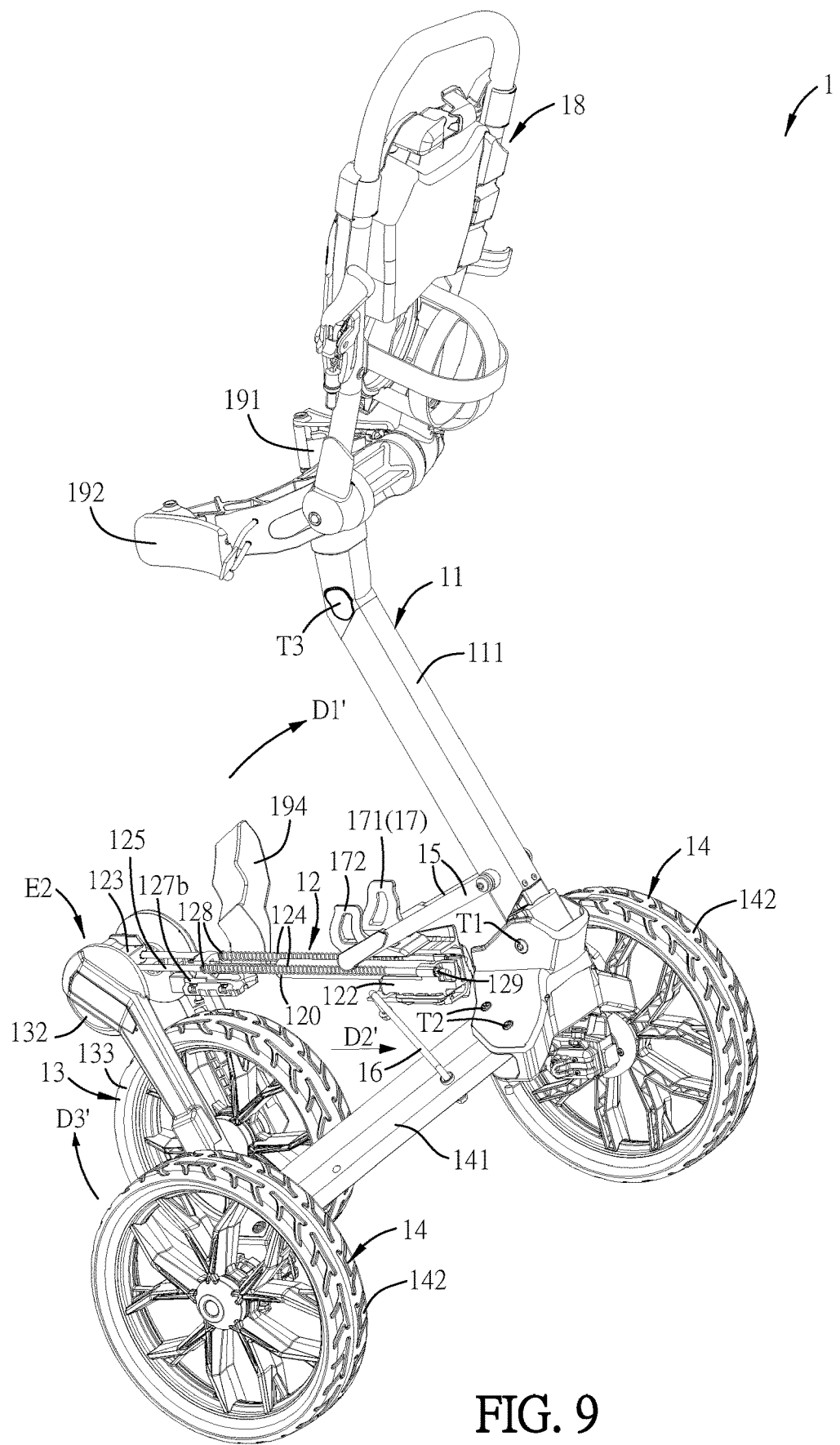
FIGS. 9 and 10 are schematic diagrams showing the unfolding procedure of the moving carrier of FIG. 1.
Figure 10:
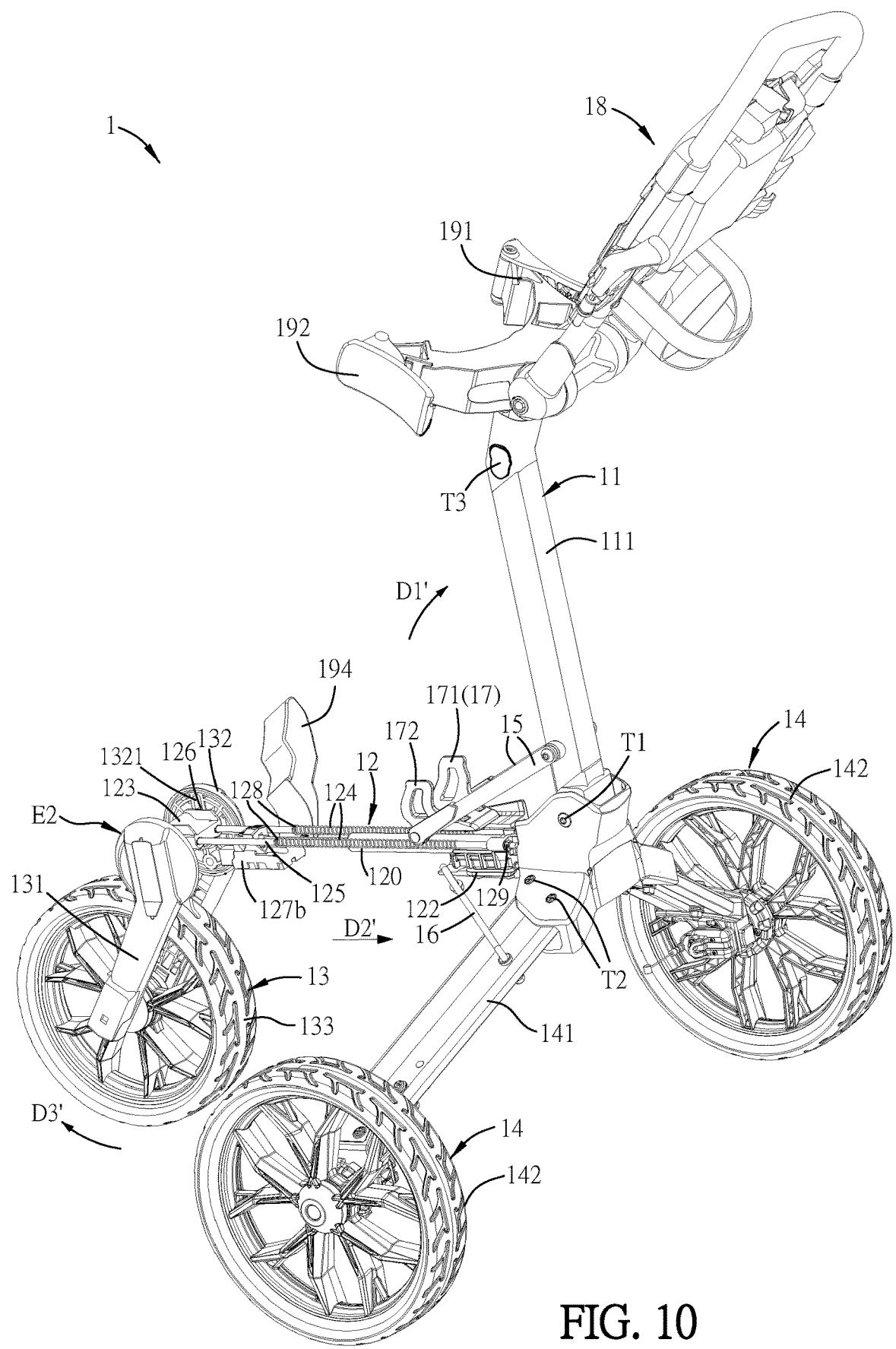

FIGS. 9 and 10 are schematic diagrams showing the unfolding procedure of the moving carrier of FIG. 1. In the case of opening (unfolding) the moving carrier 1 from the folded status (FIG. 7) to the in-use status (FIG. 1), as shown in FIGS. 9 and 10, since the linking member 120 stores the second energy, the unfolding procedure of the moving carrier 1 can be performed with the assistance of the second energy, thereby achieving the purpose of time and effort saving. In order to release the second energy stored in the linking member 120, the user can lift the upper-frame assembly 11 (including the handlebar-frame assembly 18) so as to detach the upper-frame assembly 11 from the engaging assembly 17. Then, the linking member 120 can release the second energy for assisting to move the upper-frame assembly 11 toward the opposite direction (direction D1') of the first direction D1. Meanwhile, the upper-frame assembly 11 also drives the first moving member 122 through the first connecting member 15 to move along the guiding member 125 toward the opposite direction (direction D2') of the second direction D2, and the second connecting member 16 also drives the rear-wheel assembly 14 to move toward a direction away from the lower-frame assembly 12.

In this embodiment, when the first moving member 122 starts to move along the guiding member 125 toward the opposite direction (direction D2') of the second direction D2, the second moving member 123 does not drive the third moving member 126 to push the guiding groove 1321 to move yet. In other words, when the first moving member 122 starts to move, the first moving member 122 is separated from the second stopping member 129, which is located at one end (tail) of the guiding member 125 away from the second moving member 123, by a distance. Thus, the first moving member 122 will contact against the second stopping member 129 to push the guiding member 125 to move toward the opposite direction (direction D2') of the second direction D2 after moving along the opposite direction (direction D2') of the second direction D2 for a distance (until reaching the tail of the guiding member 125). Then, the second moving member 123 can drive the third moving member 126 to push the guiding groove 1321 to move, and the transmitting member 132 can drive the front-wheel frame 131 to rotate toward the opposite direction (direction D3') of the third direction D3. Afterwards, the front wheel 133 can move toward the direction away from the lower-frame assembly 12 and reach the opening position. Accordingly, the time that the first moving member 122 starts to move along the opposite direction (direction D2') of the second direction D2 is different from the time that the guiding member 125 starts to move along the opposite direction (direction D2') of the second direction D2.

According to the above-mentioned folding and unfolding procedures, the moving carrier 1 of this embodiment can be transformed from the operation status to the folded status by simple and fast folding procedure and steps, and can be transformed from the folded status to the operation status by simple and fast unfolding procedure and steps. Thus, the moving carrier 1 of this embodiment has the advantages of easy folding and time and effort saving during the folding and unfolding procedures, and the moving carrier 1 has a small folded size, so that the user can easily carry, transport or store it.

As mentioned above, in the moving carrier of this disclosure, the lower-frame assembly comprises a first moving member disposed on the guiding member, a second moving member disposed at one end of the guiding member away from the first moving member, an elastic member disposed corresponding to the guiding member, and a third moving member disposed on the second moving member. The transmitting member of the front-wheel assembly has a guiding groove, and one end of the third moving member is disposed in the guiding groove. Based on the above-mentioned structure and design, when the first moving member moves along the guiding member, the first moving member enables the elastic member to store a first energy. When the elastic member releases the first energy, which can be released stepwise, the second moving member drives the third moving member to move and the third moving member pushes the guiding groove to move, so that the transmitting member drives the front-wheel frame to move toward the lower-frame assembly, thereby folding the moving carrier. Accordingly, it is time and effort saving in the procedures of folding and unfolding the moving carrier of this disclosure. As a result, the moving carrier of this disclosure can be easily folded and has a small folded size, so that the user can easily carry, transport or store it.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A moving carrier, comprising:
   an upper-frame assembly;
   a lower-frame assembly having a first end and a second end, wherein the upper-frame assembly is connected to the first end of the lower-frame assembly, the lower-frame assembly comprises a first moving member, a second moving member, an elastic member, a guiding member and a third moving member, the first moving member is disposed on the guiding member, the second moving member is disposed at one end of the guiding member away from the first moving member, the elastic member is disposed corresponding to the guiding member, and the third moving member is disposed on the second moving member; and
   a front-wheel assembly connected to the second end of the lower-frame assembly, wherein the front-wheel assembly comprises a transmitting member and front-wheel frame, the transmitting member is connected to the front-wheel frame and has a guiding groove, and one end of the third moving member is disposed in the guiding groove;
   wherein, when the first moving member moves along the guiding member, the first moving member enables the elastic member to store a first energy, and when the elastic member releases the first energy, the second moving member drives the third moving member to move and the third moving member pushes the guiding groove to move, so that the transmitting member drives the front-wheel frame to move toward the lower-frame assembly.

2. The moving carrier according to claim 1, further comprising:
   a rear-wheel assembly connected to the first end of the lower-frame assembly; and
   a first connecting member and a second connecting member, wherein two ends of the first connecting member connect to the first moving member and the upper-frame assembly, respectively, and two ends of the second connecting member connect to the first moving member and the rear-wheel assembly, respectively.

3. The moving carrier according to claim 2, wherein the upper-frame assembly moves toward the lower-frame assembly along a first direction, the upper-frame assembly drives the first moving member through the first connecting member to move along the guiding member toward a second direction, and the second connecting member drives the rear-wheel assembly to move toward the lower-frame assembly.

4. The moving carrier according to claim 1, wherein the guiding member passes through the elastic member.

5. The moving carrier according to claim 1, wherein the lower-frame assembly further comprises a first fixing member located at the second end of the lower-frame assembly, and the second moving member is disposed on the first fixing member.

6. The moving carrier according to claim 1, wherein the lower-frame assembly further comprises a first stopping member disposed at one side of the guiding member away from the first moving member and located between the first moving member and the second moving member.

7. The moving carrier according to claim 6, wherein when the first moving member moves along the guiding member toward a second direction, the first stopping member and the first moving member compress the elastic member.

8. The moving carrier according to claim 1, wherein the lower-frame assembly further comprises a linking member and a second fixing member, and two ends of the linking member connect to the first moving member and the second fixing member, respectively.

9. The moving carrier according to claim 8, wherein the upper-frame assembly drives the first moving member to move along the guiding member toward a second direction, and the first moving member further enables the linking member to store a second energy.

10. The moving carrier according to claim 9, wherein when the linking member releases the second energy, the first moving member moves along the guiding member toward an opposite direction of the second direction.

11. The moving carrier according to claim 10, wherein the lower-frame assembly further comprises a second stopping member disposed at one end of the guiding member away from the second moving member.

12. The moving carrier according to claim 11, wherein after the first moving member moves for a distance along the opposite direction of the second direction, the first moving member contacts against the second stopping member so as to move the guiding member toward the opposite direction of the second direction, thereby making the second moving member to drive the third moving member to push the guiding groove to move, and thus the transmitting member drives the front-wheel frame to move toward an opposite direction of a third direction.

13. The moving carrier according to claim 12, wherein a time that the first moving member starts to move along the opposite direction of the second direction is different from a time that the guiding member starts to move along the opposite direction of the second direction.

14. The moving carrier according to claim 1, wherein the third moving member passes through the second moving member.

15. The moving carrier according to claim 1, further comprising:
an engaging assembly disposed on the lower-frame assembly, wherein when the moving carrier is in a folded position, the upper-frame assembly is engaged with the engaging assembly.

16. The moving carrier according to claim 1, further comprising:
a rear-wheel assembly connected to the first end of the lower-frame assembly, wherein the rear-wheel assembly comprises two rear wheels, and when the moving carrier is in a folded position, the two rear wheels are located at two sides of the lower-frame assembly.

17. The moving carrier according to claim 1, further comprising:
a handlebar-frame assembly connected to one end of the upper-frame assembly away from the lower-frame assembly.

18. The moving carrier according to claim 17, further comprising:
a plurality of upper stopping members disposed at two sides of the handlebar-frame assembly close to the upper-frame assembly; and
a plurality of side stopping members disposed at two sides of the lower-frame assembly.

19. The moving carrier according to claim 1, wherein an opening width of the upper stopping members or the side stopping members is equal to or greater than 140 mm.

20. The moving carrier according to claim 1, further comprising:
a lower stopping member disposed at one side of the lower-frame assembly close to the front-wheel assembly.

* * * * *